United States Patent
Au et al.

(10) Patent No.: US 6,596,203 B1
(45) Date of Patent: Jul. 22, 2003

(54) METHOD AND APPARATUS FOR INCREASING UV DOSE AND THROUGHPUT OF HIGH SPEED UF CURING PROCESSES

(75) Inventors: David Tatwai Au, Suwanee, GA (US); Vidyananda Bangalore Chandraiah, Lawrenceville, GA (US); Kenneth Wade Jackson, Snellville, GA (US); Neil Wilbur Sollenberger, Duluth, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/565,291

(22) Filed: May 2, 2000

(51) Int. Cl.⁷ .......................... B29D 11/00; B29C 71/04
(52) U.S. Cl. .................. 264/1.27; 118/67; 264/495; 425/174.4; 427/163.2
(58) Field of Search ................ 264/1.27, 1.36, 264/1.38, 495; 425/174.4; 427/163.2; 392/416–419; 219/388; 118/66, 67

(56) References Cited

U.S. PATENT DOCUMENTS

| | | | |
|---|---|---|---|
| 3,922,391 A | * 11/1975 | Qualtrough et al. | |
| 4,113,350 A | 9/1978 | Haines | 350/96.29 |
| 4,125,644 A | 11/1978 | Ketley et al. | 427/36 |
| 4,344,669 A | 8/1982 | Uchida et al. | 350/96.3 |
| 4,629,285 A | 12/1986 | Carter et al. | 350/96.23 |
| 4,900,126 A | 2/1990 | Jackson et al. | 350/46.23 |
| 4,913,930 A | * 4/1990 | Getson | |
| 5,223,187 A | 6/1993 | Chantry et al. | 264/25 |
| 5,263,265 A | 11/1993 | Melgaard | 34/17 |
| 5,809,195 A | 9/1998 | Brown et al. | 385/114 |

FOREIGN PATENT DOCUMENTS

| | | |
|---|---|---|
| DE | 966 247 C | 7/1957 |
| DE | 12 19 638 b | 6/1966 |
| GB | 2109581 A | 6/1983 |
| JP | 62 028227 A | 2/1987 |

* cited by examiner

*Primary Examiner*—Mathieu D. Vargot
(74) *Attorney, Agent, or Firm*—Thomas, Kayden, Horstemeyer & Risley, LLP

(57) ABSTRACT

An assembly for curing a linear work product which is passed through a curing oven at high speed along a first path the assembly having a first path altering member, such as a sheave, re-directing the work product through the oven along at least a second path spaced from the first path. A plurality of such sheaves in a first embodiment redirect the work product through the entrance end of the oven for travel along a second path in the same direction as in the first path. In a second embodiment, the path altering members re-direct the work product into the exit end of the oven for travel in a second path in the opposite direction to the first path. Additional curing may be realized by passing the work product through the curing oven in the same or in opposite directions, as desired or as necessary.

16 Claims, 2 Drawing Sheets

METHOD AND APPARATUS FOR INCREASING UV DOSE AND THROUGHPUT OF HIGH SPEED UF CURING PROCESSES

FIELD OF THE INVENTION

This invention relates to the coloring of color coded optical waveguides with a relatively thin coating of ultraviolet curable ink, and to other UV curing processes.

BACKGROUND OF THE INVENTION

The use of optical fiber waveguides, either as individual fibers or as an array of a plurality of such fibers in a ribbon form for transmitting data has become the preferred mode of signal transmission. Optical fibers have extremely high information carrying capacity as compared to metal electrical conductors.

Optical fibers are both very small in diameter and are extremely fragile, thus making individual fibers hard to handle and manipulate. Thus, it has been the practice to combine large numbers of fibers in a cable, or in a fiber ribbon which comprises multiple fibers extending parallel to each other and encased in a matrix material. The large numbers of virtually identical fibers present in such combinations makes fiber connection and splicing almost impossible without some method of fiber identification. One such method that is widely used is color coding the individual fibers preferably in accordance with a standard code, such as is used for metal conductors. Such color coding, while efficacious, is difficult to achieve, especially in a production milieu where speed or high productive capacity is most desirable.

For example, it has not proven satisfactory to use conventional solvent based colorants, such as dyes, marking fluids, inks and the like for high speed color coding of optical glass fiber waveguides, since such solvent based colorant films are formed by evaporative drying of the solvent which is a relatively slow process. Also, solvent-based ink systems do not have the desired long term resistance to the solvents, oils, and gels encountered in the cable installation environment. Solvent-based colorants are also easily worn away by the physical abrasion typically encountered in cabling. Furthermore, such materials often contain environmentally undesirable solvents and are difficult to apply with sufficient precision to leave a truly uniform coating about the circumference of the optical fiber. As far as the application of liquid solvent inks is concerned, conventional ink application apparatus and techniques are not optimally suited for processing the optical fiber at high speeds of the order of 10 m/sec.

As stated above, optical glass fibers are very fragile and easily subject to damages. Typically, therefore, they are coated with one or several protective plastic coatings as are discussed in U.S. Pat. Nos. 4,125,644 and 4,344,669. These protective coatings are applied as soon as the fibers are formed to protect against abrasion during takeup and handling. It has been stated in U.S. Pat. No. 4,125,644 that various additives including pigments may be added to these protective plastic coatings, if desired. Thus, to some degree coloration of the exterior of the fiber by coloration of the protective coating may be accomplished by the fiber producer to assist him in identifying particular products. However, as noted in U.S. Pat. No. 4,125,644, the type and quantities of substances added to the buffer coatings must be selected with care to avoid disturbing the desired qualities of the coatings. Also, the addition of pigment additives to the buffer coatings can slow down the drawing and curing of the fibers and the overall fiber production speed. Furthermore, in the production of optical fiber cables, it is important that the physical and optical characteristics of the fiber waveguides in the cable be carefully matched, and it is often desirable that all of the fiber waveguides be from the same production run or lot. Thus, even though it may be known that colorants can be added to the buffer coatings, as noted above, it is not feasible for the fiber producer to attempt to color code the fibers for fiber identification purposes by this method.

It has been found that an optical fiber waveguide comprising a fiber having a protective coating thereon can be successfully color coded by providing it with an additional coating of a colored, ultraviolet (UV) cured ink applied as a very thin film of, for example, five to twelve (5 to 12) microns in thickness. Such a coating is applied and affixed by passing the fiber at a relative high speed through a coating apparatus and, subsequently, through a UV radiation curing apparatus or oven, and then winding the fiber on a take-up spool or passing it on to another production stage or stages where, ultimately, it is wound on a take-up spool.

Where the fibers are to be arrayed in a ribbon configuration, each optical fiber is enclosed in inner and outer layers of coating materials and is provided with a color identifier. The inner layer is comprised of a UV curable bonding material having a modulus in the range of about 1 M Pa. For mechanical protection, the outer layer is a UV curable bonding material having a modulus in the range of about 1 Gpa. When the optical fibers are disposed in the parallel array, interstices are created between the fibers and between the fiber and an envelope which is spaced about 25 μm at its closest point to each fiber. A UV curable matrix bonding material which has a modulus having a value less than that of the outer coating layer on the fiber and more than that of the inner coating layer fills the interstices, extends to the peripheral line which defines the envelope, and bonds together the optical fibers. The modulus of the matrix material and the bond of the matrix material to the color identifier on the optical fibers is such that interfiber and interribbon movement is allowed. Also, accessing of the individual fibers is allowed upon the application of peeling forces by a craftsperson without the need for complex tools and without obfuscating the color identifier.

In both ribbon configurations and with individual fibers for cabling, for example, there is at least one UV ink curing step and, for ribbons, two UV curing steps. With the current family of inks, matrix materials, and the UV capabilities of the current coloring machines, coloring speeds are generally of the order of 10 meters/second to meet the prescribed cure levels. Ribbons made with fibers colored at higher coloring speeds cause detrimental changes in the operative properties of the ribbon. As a consequence, it has been the practice to limit the speed of the production process to assure a predetermined dose of UV radiation is applied to effect full cure of the ink colorant. Higher speeds can be realized if higher cure levels can be achieved such as by additional UV ovens or UV ovens of higher power; however, increasing the UV intensity or power also requires a major modification of equipment such as changing the entire oven, power supply and the exhaust system. Space limitations, as well as ergonomic and safety issues in existing coloring lines, make using additional UV ovens difficult, which would require significant changes in the "footprint" of the coloring machine and complicate process control. Inasmuch as there is, presently, a huge investment in coloring machines and in the entire production coloring stage, remodeling the coloring stage to add one additional coloring machine would be an expensive proposition. New fiber production lines can allow for such additions, but current lines, in general, do not.

SUMMARY OF THE INVENTION

The present invention is a retrofit arrangement designed for use with existing color coding or ribboning UV curing apparatus for optical fiber waveguides to increase the speed of the fiber throughout the production process while maintaining a minimum dose of UV radiation, although it is not restricted to retrofitting existing equipment. As such, the apparatus of the invention does not require an increase in space or foot print of the curing apparatus, yet it results in greatly increased line speeds, hence increased fiber production per unit of time. Also, the invention provides improved uniformity of cure over the entire surface of the ink colorant because both sides of the fiber profile alternatively face the source of UV radiation. As pointed out hereinbefore, such higher line speeds have heretofore been achievable through the addition of one or more UV ovens which requires more space than present curing apparatus and renders the entire production line inoperative during the upgrade.

The present invention, in a first illustrative embodiment thereof, comprises a UV curing stage wherein the fiber, coated with ink of the desired color is passed through a UV curing oven at a considerably greater speed than heretofore used. At the line exit end of the oven are first and second turn-around sheaves which route the fiber, which is only partially cured, back to third and fourth sheaves which, in turn, route the fiber into and through the same UV oven for a second exposure to the UV radiation. The fiber emerging from the oven is then passed, by means of an exit or take-up sheave to other stages or to, ultimately, the fiber take-up and spooling apparatus. The path of the fiber in the second pass through the oven is off-set from the first path a distance sufficient to prevent touching of the fiber in the two paths, but less than the diameter of the "sweet spot" of the UV radiation within the oven. When the apparatus is used in ribbon curing, this requires that the "sweet spot" comprising the focused region of UV radiation be of a sufficient diameter to envelope completely both ribbon paths. With such an arrangement, the single UV oven assumes the functions of first and second ovens a comparable result, i.e., greater line speed, achievable heretofore only with an additional UV oven.

In a second preferred embodiment of the invention, the fiber emerging from the exit end of the UV oven is directed back into the oven through the exit end in the reverse direction by a single turn-around sheave, and passes therethrough in the opposite direction to the first path to second and third turn-around or idler sheaves which direct it to the take-up sheave and take-up mechanism. The second embodiment is somewhat simpler to set up than the first embodiment, but makes possible substantially the same end result, i.e., greater line speed.

In both embodiments of the invention, as well as variants thereof which may occur to workers in the art the residence time of the substrate in the presence of the UV curing radiation is approximately double that of exiting curing apparatus.

The numerous features and advantages of the present invention will be more fully apparent and understood from the following detailed description, read in conjunction with the accompanying drawings.

DETAILED DESCRIPTION

Figure 1:
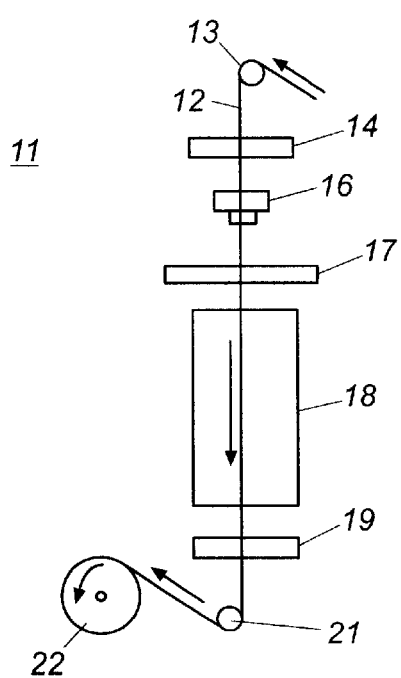
FIG. 1 is a diagrammatic view of a prior art apparatus for UV curing a work element having curable material thereon.

The following detailed description is directed primarily to the UV curing of single optical fibers coated with a UV curable ink but, as will be readily apparent, the features and principles of the present invention are equally applicable to UV curing of optical fiber ribbons as well as other applications involving a high speed UV curing operation. It is conceivable that these features and principles, as discussed hereinafter, may be subject to modification by workers in the art without departure from the spirit and scope thereof FIG. 1 is a diagrammatic depiction of a prior art UV curing station 11 as currently used in the industry, for coloring a fiber 12 with a UV curable ink, and subsequently curing the ink. As shown in FIG. 1, fiber 12, which is being moved or drawn in the direction of the arrows, passes from preceding production stages, not shown, sequentially over an idler sheave 13, through a micrometer 14, such as a laser micrometer, a coloring die 16 where the coloring ink is applied as a thin coating on fiber 12, through a concentricity meter 17 into and through a UV curing oven 18. Upon exiting the oven 18, fiber 12, now having a cured colorant coating thereon, passes through a second laser micrometer 19, around a sheave 21 to a take-up reel 22 which is driven by suitable means, not shown, to supply the drawing force for the fiber. Take-up reel may include a capstan, not shown, or may as is also intended, represent subsequent operations, such as ribboning operation, which generally have a take-up reel at the end thereof.

The arrangement 11 of FIG. 1, which may be contained within a single machine configuration, is an accurate depiction of an optical fiber coloring stage which, with various minor variations, is used throughout the industry. As is pointed out in the preceding, with the ink and/or matrix materials used today, and the UV capabilities of current coloring machines, the speed of the fiber passing therethrough is generally limited to approximately 10 meters per second (10 m/sec) in order to insure meeting the prescribed cure levels. Higher speeds can result in detrimental changes in the operating properties of a ribbon, or can have the coloring ink only partially cured and thus liable to have undesirable performance characteristics through usage. Further, because of the widespread use of the arrangement of FIG. 1, which is usually incorporated into a unitary machine, it would be economically unfeasible to replace such a machine with a new machine having, for example, a more powerful UV curing oven, or, where space is at a premium, to alter existing machines to have greater curing power, where such alteration involves changing and enlarging the machine footprint.

Figure 2:
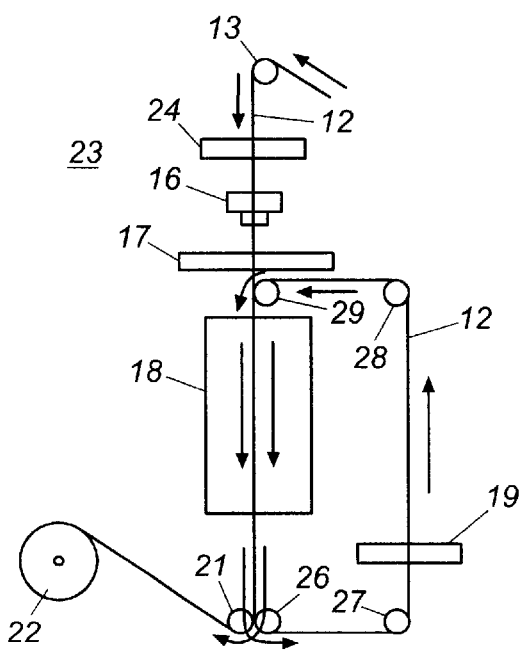
FIG. 2 is a diagrammatic view of a first embodiment of the invention.

In FIG. 2 there is shown diagrammatically the apparatus 23 of the present invention, which constitutes a retro-fit for the machine 11 of FIG. 1 and which represents virtually no increase in the footprint thereof. It is to be understood that the spacings in FIG. 2 are exaggerated for clarity. Also, like parts bear the same reference numerals through the several figures. In the arrangement of FIG. 2, the fiber 12 is passed through oven 18 as in the apparatus of FIG. 1 but after exiting the oven 18, fiber 12 is redirected back to the entrance to the oven 18 by turn-around sheaves 26, 27, 28, and 29 and passes through the oven 18 along a second path 30 closely adjacent the first path 25, but spaced therefrom, as shown in FIG. 3, which is an exaggerated depiction of the actual path spacing.

Figure 3:
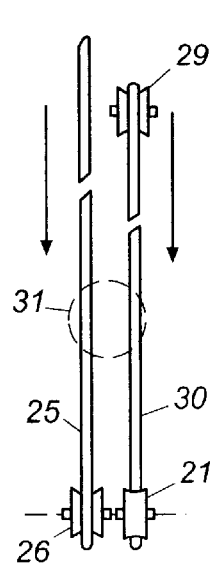
FIG. 3 is a diagram of a portion of the arrangement of FIG. 2 wherein coated optical fiber is subjected to UV radiation.
Figure 4:
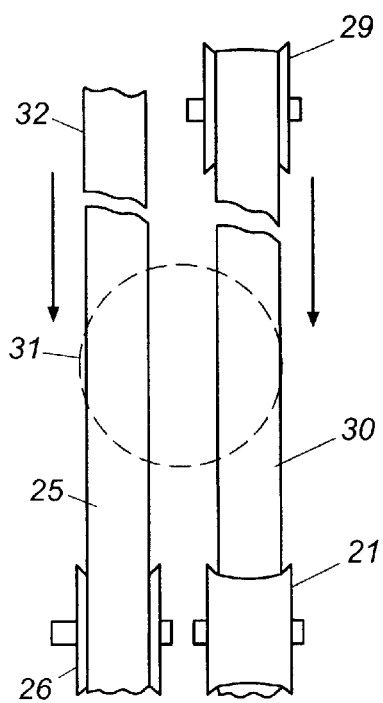
FIG. 4 is a diagram of a portion of the arrangement of FIG. 2 wherein optical fiber ribbon is subjected to UV radiation.

Most UV ovens are characterized by a "sweet spot" 31, as seen in FIG. 3 which is a focused area of maximum uniform intensity of the UV radiation within the oven. In the arrangement of FIGS. 2 and 3, the sweet spot 31 should have sufficient diameter or cross-sectional area to cover the fiber in paths 25 and 30 so that optimum radiation occurs in both paths. FIG. 4 represents the path configuration for the apparatus of FIG. 2 as used for curing the matrix material of a fiber ribbon 32, and it can be seen that the sweet spot 31 is large enough to provide optimum curing of the material in each of the paths 25 and 30 simultaneously.

Figure 5:
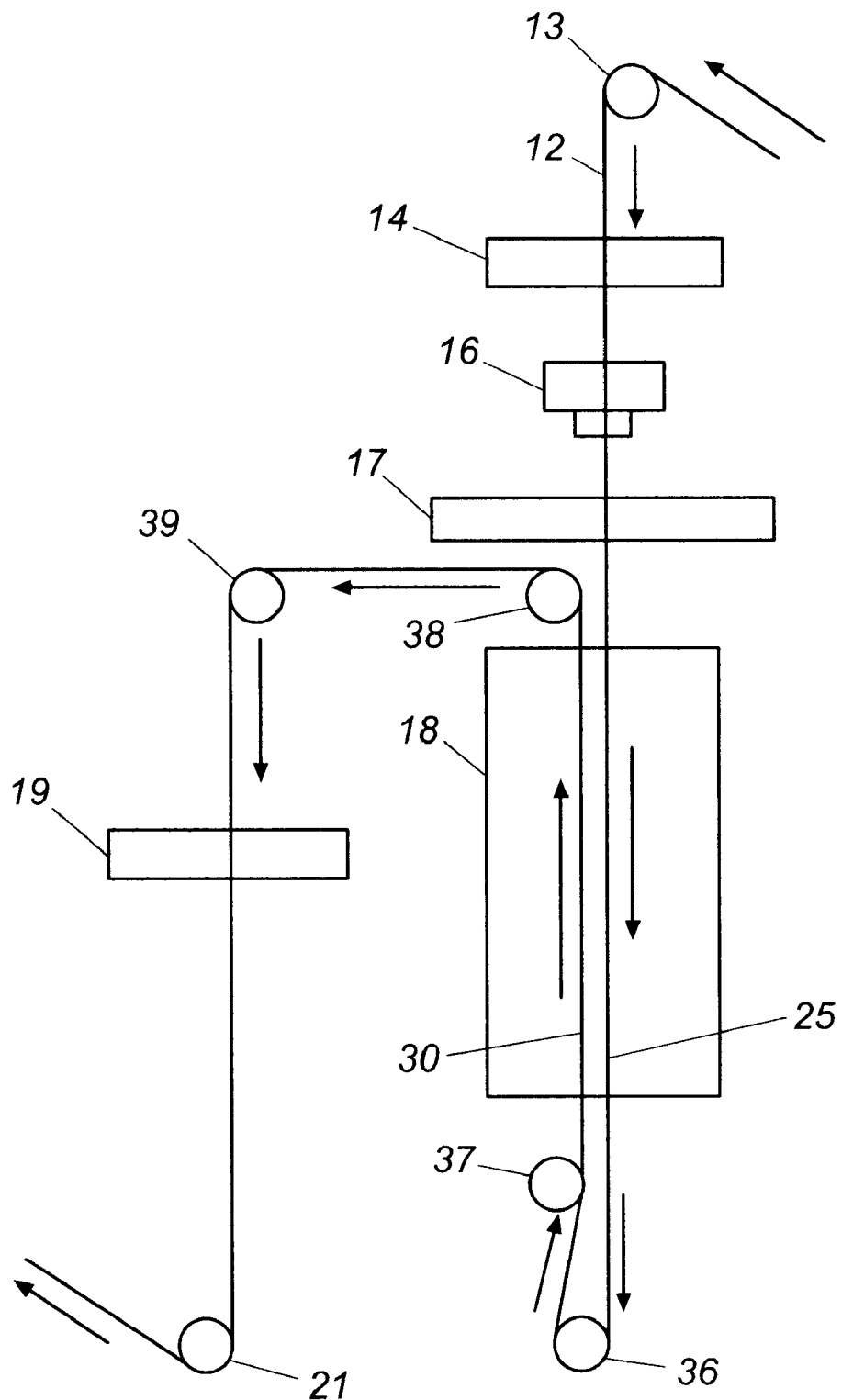
FIG. 5 is a diagrammatic view of a second embodiment of the invention.

In the path arrangement of FIG. 2, as depicted in FIG. 4, one side of the ribbon usually receives more UV exposure than the other side, despite making two transverse of the oven 18. In FIG. 5 there is shown a second embodiment of the invention where both sides of the fiber 12 or ribbon 32 receive approximately equal amounts of UV exposure. The initial pass through oven 18 for fiber 12 or ribbon 32 is essentially the same as for the arrangements of FIGS. 1 and 2. However, upon emerging from the exit end of the oven 18, the direction of the work (fiber 12 or ribbon 32) is reversed by a turn-around sheave 36 and an aligning sheave 37 so that it passes through oven 18 in the opposite direction, as shown by the arrows. The spacing of the two paths 25 and 30 of the work member is similar to that shown in FIGS. 3 and 4 but the directions of travel are opposite. The sweet spot 31 of the UV radiation in the case of ribbon 32, impinges one surface of the ribbon in path 25 and the other surface of the ribbon in path 30, thus insuring full curing of the entire ribbon. The other surfaces of the ribbon 32 also receive UV radiation although not directly impinged by the sweet spot. Oven 18 can be equipped with focusing and reflective members to insure that both surfaces receive UV radiation in each of paths 25 and 30.

Upon emerging from the original entrance end of oven 18, the work member is directed by sheaves 38 and 39 to take-up sheave 21. It is to be understood that sheave 38 may be replaced by sheave 21 and sheave 39 eliminated, in which case laser micrometer 19 can be located between sheave 21 and take-up reel 22 (or subsequent production stages). Inasmuch as UV curing machines may differ in overall configuration, other sheave arrangements than those shown in FIGS. 2 and 5 may be devised by workers in the art. In all cases, however, the UV radiation in oven 18 should impinge at least twice on the work member, i.e., fiber, ribbon, or other UV curable member. The arrangements of the embodiments of the invention as shown in FIGS. 2 and 5 do not necessarily translate into doubling the speed of travel of the work members, primarily because of non-linear curing rates. However, speed increases are possible which constitute a salutary speed increase for curing machines in place. The invention, therefore, makes possible increased UV dosage and fiber or other work member throughput without replacement of currently used UV radiation stages. Greater speeds are possible by adapting the principles and features of the invention as disclosed to multiple passes (greater than two) through the curing oven, where space is sufficient to permit additional re-routing members, such as sheaves. It is to be understood that the principles of the invention, an applicable to new machines as well as to retrofitting existing machines. These principles, as illustrated in the figures, have the virtue of simplicity which, in itself, is economically attractive to designers of new machines.

In concluding the detailed description, it should be noted that it will be obvious to those skilled in the art that many variations and modifications may be made to the preferred embodiments without substantial departure from the principles of the present invention. All such variations and modifications are intended to be included herein as being within the scope of the present invention. Further, in the claims hereafter, the corresponding structure, materials, and acts and equivalents of all means or step plus function elements are intended to include any structure, material, or acts for performing the functions with other claimed elements or steps as specifically claimed.

What is claimed is:

1. An apparatus for curing a work product having a radiation curable coating thereon, said apparatus comprising:

a curing oven having an entrance end and an exit end and having a first path therethrough between said ends for the work product; said curing oven having a region of maximum uniform intensity of curing radiation through which said first path passes for partially curing said work product;

a first path altering member adjacent said exit end for redirecting said work product in a second path through said oven, spaced from said first path and passing through said oven region of maximum uniform intensity of radiation for additional curing of said work product; and a take-up member for directing the work product in said second path as it emerges from said oven to a subsequent operation.

2. The apparatus as claimed in claim 1 wherein said second path directs the work product to a take up member.

3. The apparatus as claimed in claim 2 wherein said first path altering member is positioned to direct the work product to second, third, and fourth path altering members which define said second path for the work product that reintroduces the work product into the entrance end of the oven along said second path.

4. The apparatus as claimed in claim 3 wherein the work product travels said second path through the oven in the same direction as the first path.

5. The apparatus as claimed in claim 4 wherein said path altering members are sheaves.

6. The apparatus as claimed in claim 2 wherein said first path altering member is positioned to direct the work product back through the exit end of the oven along said second path in a direction opposite to the direction of travel of the work product along said first path.

7. The apparatus as claimed in claim 6 and further comprising a second path altering member adjacent the entrance end of the oven for directing the work product in said second path to the take-up member.

8. The apparatus as claimed in claim 7 wherein said path altering members are sheaves.

9. A method of exposing an optical fiber work member having ultra-violet curable material thereon to ultra-violet radiation comprising:

passing the work member into and through an ultra-violet curing oven along a first path whereby said work member is at least partially cured;

reintroducing the work member into the oven for travel therethrough along a second path; and passing the fiber emerging from the oven along said second path to a subsequent post curing stage.

10. The method as claimed in claim 9 wherein the oven is characterized by a region of maximum uniform intensity of radiation, and said second path is spaced from said first path a distance less than the width of said region spot and the work product travels therealong in the same direction as in said first path.

11. The method as claimed in claim 9 wherein the oven is characterized by a region of maximum uniform intensity of radiation, and said second path is spaced from said first path a distance less than the width of the said region and the work product travels therealong in the opposite direction of its travel in the first path.

12. An apparatus for color coding an optical fiber comprising in seriatim:

a coloring die through which the optical fiber is adapted to pass;

an ultra-violet curing oven through which the fiber passes along a first path between an entrance end and an exit end;

a first turn-around member adjacent the exit end of said oven over which the fiber in said first path is adapted to pass for re-directing the fiber onto a second path through said oven spaced from said first path; and a take-up member for directing the fiber in said second path as it emerges from said oven to a subsequent operation.

13. An apparatus as claimed in claim 12 and further comprising a plurality of second turn-around members exterior to said oven for redirecting said second path to said entrance end for fiber travel through said oven in the same direction as its travel in said first path.

14. An apparatus as claimed in claim 13 wherein said first and second turn-around members are sheaves.

15. An apparatus as claimed in claim 12 wherein said first turn-around member directs the fiber along said second path in a direction opposite to the fiber travel in said first path.

16. An apparatus as claimed in claim 15 wherein said first turn-around member is a sheave.

* * * * *